United States Patent
Kosciej et al.

(10) Patent No.: US 12,255,891 B2
(45) Date of Patent: Mar. 18, 2025

(54) SELECTING AUTHENTICATION METHOD BASED ON USER CONSTRAINTS

(71) Applicant: MOTOROLA SOLUTIONS, INC., Chicago, IL (US)

(72) Inventors: Rafal Kosciej, Dąbrowa Górnicza (PL); Piotr Furman, Grojec (PL); Grzegorz Gustof, Myslenice (PL); Maciej Klesiewicz, Cracow (PL); Krzysztof Minior, Rudawa (PL); Robert R. Zeglen, Lubzina (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 215 days.

(21) Appl. No.: 17/936,461

(22) Filed: Sep. 29, 2022

(65) Prior Publication Data
US 2024/0114023 A1   Apr. 4, 2024

(51) Int. Cl.
*H04L 9/40*   (2022.01)

(52) U.S. Cl.
CPC ........ *H04L 63/0861* (2013.01); *H04L 63/205* (2013.01)

(58) Field of Classification Search
None
See application file for complete search history.

(56) References Cited

U.S. PATENT DOCUMENTS

| | | | |
|---|---|---|---|
| 9,092,600 B2 * | 7/2015 | Scavezze | H04L 63/08 |
| 9,202,105 B1 * | 12/2015 | Wang | H04N 21/44008 |
| 9,600,649 B2 * | 3/2017 | Parry | G06F 21/316 |
| 9,811,650 B2 * | 11/2017 | Todeschini | G06F 3/16 |
| 10,375,119 B2 * | 8/2019 | Aronowitz | H04L 63/205 |
| 10,579,784 B2 * | 3/2020 | Turgeman | G06F 3/017 |
| 11,017,209 B2 * | 5/2021 | Sehgal | G06V 40/166 |
| 11,068,615 B2 * | 7/2021 | Levy | G06N 3/0675 |
| 11,310,226 B2 * | 4/2022 | Nair | G01S 13/584 |
| 2012/0081229 A1 * | 4/2012 | Daniel | G08B 13/19615 340/573.1 |
| 2014/0341441 A1 * | 11/2014 | Slaby | G06V 40/193 382/117 |
| 2015/0379256 A1 * | 12/2015 | Parry | H04L 63/0861 726/4 |

(Continued)

OTHER PUBLICATIONS

Matsuo, et al., "Dynamic authentication method dependent on surrounding environment," 2018 IEEE 7th Global Conference on Consumer Electronics (GCCE), 2018, (pp. 855-857).

*Primary Examiner* — Backhean Tiv
(74) *Attorney, Agent, or Firm* — Michael Best & Friedrich LLP (57) ABSTRACT

Methods and systems for authenticating a user. One system includes a camera and an authentication computer. The authentication computer is configured to receive an image of a user captured by the camera, determine, based on the image, a constraint of the user impacting an availability of a part of the user's body for use in authenticating the user, and determine, based on the constraint of the user, an action to be performed by the user. The authentication computer is also configured to transmit data to a user device worn by the user, the data usable by the user device to output instructions to the user to perform the action, and, in response to detecting the action performed by the user, authenticating the user to use a resource.

15 Claims, 3 Drawing Sheets

(56) References Cited

U.S. PATENT DOCUMENTS

| | | | |
|---|---|---|---|
| 2016/0012740 A1* | 1/2016 | Arnold | G06F 3/011 |
| | | | 434/350 |
| 2018/0018454 A1* | 1/2018 | Parry | H04L 63/0428 |
| 2018/0089503 A1* | 3/2018 | MacDonald | G06V 40/45 |
| 2018/0367526 A1* | 12/2018 | Huang | H04L 63/0807 |
| 2019/0311095 A1* | 10/2019 | Paeschke | G06F 21/316 |
| 2020/0074060 A1* | 3/2020 | Oh | G06N 5/04 |
| 2020/0143345 A1* | 5/2020 | Adams | G06F 3/011 |
| 2022/0035440 A1* | 2/2022 | Keen | G06F 3/011 |
| 2022/0318348 A1* | 10/2022 | Sims | G06V 10/143 |
| 2022/0382839 A1* | 12/2022 | Vargas | G06N 3/04 |
| 2024/0114023 A1* | 4/2024 | Kosciej | H04L 63/205 |
| 2024/0193246 A1* | 6/2024 | Bansal | G06F 21/36 |

\* cited by examiner

SELECTING AUTHENTICATION METHOD BASED ON USER CONSTRAINTS

BACKGROUND OF THE INVENTION

Authentication is the process of verifying a user's identity, which, once verified, can be used to control the user's access to a resource, such as a locked room or compartment, a computer resource, such as, a database or computing services, or the like. Some resources are associated with multiple factor authentication that provides additional security over single factor authentication, which is vulnerable to brute force attacks and theft. In multiple factor authentication (also referred to as "multi-factor authentication"), a user is granted access to a resource after successfully presenting two or more pieces of authentication data. For example, as a first factor, a user may present biometric authentication data and, as a second factor, the user may input a password or code.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, authentication, including multi-factor authentication, requires authentication data from a user, which is used by an authentication system to verify the user's identity and control access to one or more resources, including physical resources, such as, for example, a room, equipment, and the like; computer resources, including databases, services, and the like; or combinations thereof.

In some situations, a user may be unable to provide particular authentication data or may be unable to efficiently provide such data, such as, for example, within a predetermined period of time often associated multi-factor authentication processes. For example, a user may be constrained in various situations, which limits the availability of one or more parts of the user, such as, for example, the user's face, hands, or voice and impacts the user's ability to provide authentication data. As one non-limiting example, public safety personnel, such as, for example, first responders, may wear gloves or masks, which makes it difficult to provide biometric authentication data, such as a fingerprint or facial recognition. Similarly, public safety personnel may, in some situations, have limited availability to use their hands or voices to input passwords or codes into a keypad or an access an application on the user's personal device, such as when public safety personnel are leading a suspect or are operating in a covert situation.

Accordingly, embodiments described herein provide methods and systems for detecting a current state of a user and automatically selecting, from a plurality of available authentication methods, an authentication method based on the user's current state. Some embodiments described here inform the user of the selected authentication method via an augmented reality (AR) device worn by the user. For example, when a user cannot use their hands to provide authentication data, the user similarly may not be able to use their phone or other user device to learn how he or she is supposed to provide authentication data via the selected method. However, an AR device worn by the user can instruct, for example, visually, audibly, or a combination thereof, a user to perform the selected authentication method to provide authentication data, such as, for example, by instructing the user to move a part of the user's body, speak a particular phrase, or perform a sequence of movements and spoken phrases. Similarly, in some embodiments, an AR object provided via the AR device can be used in the authentication method, which can provide further security and strength of the authentication method. For example, instructing the user to interact with a provided AR object provides a unique authentication method, which may be less vulnerable to brute-force attacks or theft than other authentication methods. Similarly, in some embodiments, the selected authentication method may involve an object detected in the user's current position, such as, for example, movement of sunglasses or a mask worn by the user or interaction with equipment associated with the user.

Also, in some embodiments, in response to detecting two or more users at an authentication point, an authentication method may be selected that requires an action to be performed by each user, which, again, provides a unique authentication method unlikely to be stolen or misused as the authentication method cannot be imitated by a single eavesdropper or other unauthorized individual. For example, in a two-user situation, both users may be instructed to perform a particular action or sequence (which may be the same action or a different action for each user) or may be instructed to interact with an AR object. As one non-limiting example, two users may be instructed to pull an AR rope, wherein this action cannot be performed by just one user.

For example, some embodiments described herein use AR in a multi-factor authentication process. A user wears an AR device, such as for example, AR glasses, virtual reality (VR) glasses, or AR/VR glasses (collectively referred to herein as "smart glasses"). When approaching an authentication point, the authentication point may use biometric authentication as a first factor of a multi-factor authentication process. For example, the authentication point may use facial recognition to verify the user's identity. Biometric authentication, however, can sometimes lead to false positives, such as, for example, when facial recognition is performed on low-quality video stream taken from a far distance. Similarly, other forms of authentication, such as detecting a passive radio frequency (RF) signal transmitted by an RF device carried by the user, may be susceptible to theft and impersonation. To minimize false positives and authentication vulnerabilities, embodiments described herein may leverage AR authentication as the second factor and, in particular, embodiments, described herein select an authentication method for us with the user's AR device that takes into account the current state of the user.

When the authentication method is selected, the authentication point sends instructions to the AR device, wherein the instructions instruct the user to perform an action. In response to the action being executed correctly (in response to detecting performance of the instructed action by the user with the authentication device, the AR device, or a combination thereof), the user is authenticated. As described above, the requested action is dynamically selected based on any constraints of the user, which represent the availability of one or more parts of the user's body to provide authentication data. For example, in situations where the user's hands are not available, such as, for example, because the user is apprehending or moving a suspect, the instructions may instruct the user to nod their head to provide authentication data for the authentication point. In other words, the selected authentication method may be based on what the user is currently doing or in possession of, such as, for example, whether one or both of the user's hands are full, whether the user is wearing sunglasses, or the like.

It should be understood that embodiments described herein are not limited to AR device and may be used with other user devices worn by a user, such as, for example, a smart phone, radio, smart watch or other wearable device, or the like. Also, embodiments described herein are not limited to determining user constraints based on image data captured by a camera. For example, in some embodiments, as an alternative or in addition to capturing image data of a user, stored user information is received by the authentication system and used to determine an action to be performed by the user. The stored user information may include information regarding equipment associated with the user; one or more conditions of the user, such as, for example, religious practices, behavioral practices or preferences, or the like; one or more limitations of the users; one or more user disabilities; or a combination thereof. This user information may be stored by the authentication system or received from one or more devices or systems external to the authentication system. Similar to how the authentication system uses physical constraints of a user detected based on captured image data, the authentication system can use the stored user information to determine one or more constraints of the user (and, inherently the user capabilities) and determine an authentication action accordingly. Thus, as described herein, the authentication system can use various forms of user information in determining an authentication action and is not limited to using captured image data.

For example, some embodiments described herein provide a system for performing user authentication. The system includes a camera, and an authentication computer. The authentication computer is configured to receive an image of a user captured by the camera, determine, based on the image, a constraint of the user impacting an availability of a part of the user's body for use in authenticating the user, and determine, based on the constraint of the user, an action to be performed by the user. The authentication computer is also configured to transmit data to a user device worn by the user, the data usable by the user device to output instructions to the user to perform the action, and, in response to detecting the action performed by the user, authenticating the user to use a resource.

Another embodiment provides a method for performing user authentication. The method includes receiving, with an authentication system, stored user information, the user information representing one or more capabilities of a user, and determining, with the authentication system based on the received user information, an action to be performed by the user. The method also includes transmitting, with the authentication system, data to a user device worn by the user, the data usable by the user device to output instructions to the user to perform the action, and, in response to detecting the action performed by the user, authenticating the user to use a resource.

A further embodiment provides a non-transitory computer readable medium storing instructions that, when executed by at least one electronic processor, perform a set of functions. The set of functions includes receiving user information, the user information including at least one selected from group consisting of an image of a user captured by a camera and stored user information, determining, based on the user information, a constraint of the user impacting the user's ability to provide authentication data, and determining, based on the constraint of the user, an action to be performed by the user. The set of functions also includes transmitting data to a user device worn by the user, the data usable by the user device to output instructions to the user to perform the action, and, in response to detecting the action performed by the user, authenticating the user to use a resource.

In addition to improving the user's ability to provide authentication data and gain access to a resource, the dynamic selection of an authentication method as described herein improves the strength and security of the authentication. For example, the changing authentication method, action, or both makes it difficult for an eavesdropper to intercept authentication data and later repeat or replay the authentication data to gain unauthorized access to a resource. Similarly, in some embodiments, multiple authentication method options may be presented to a user, wherein one of the authentication methods allows the user to indicate he or she is under distress. For example, depending on the detected current state of the user, two authentication methods may be selected, wherein both methods, when executed correctly, provide authentication data but one of the methods informs the authentication system that the user is under distress, which may be used to dispatch aid, trigger an alarm, or the like.

Figure 1:
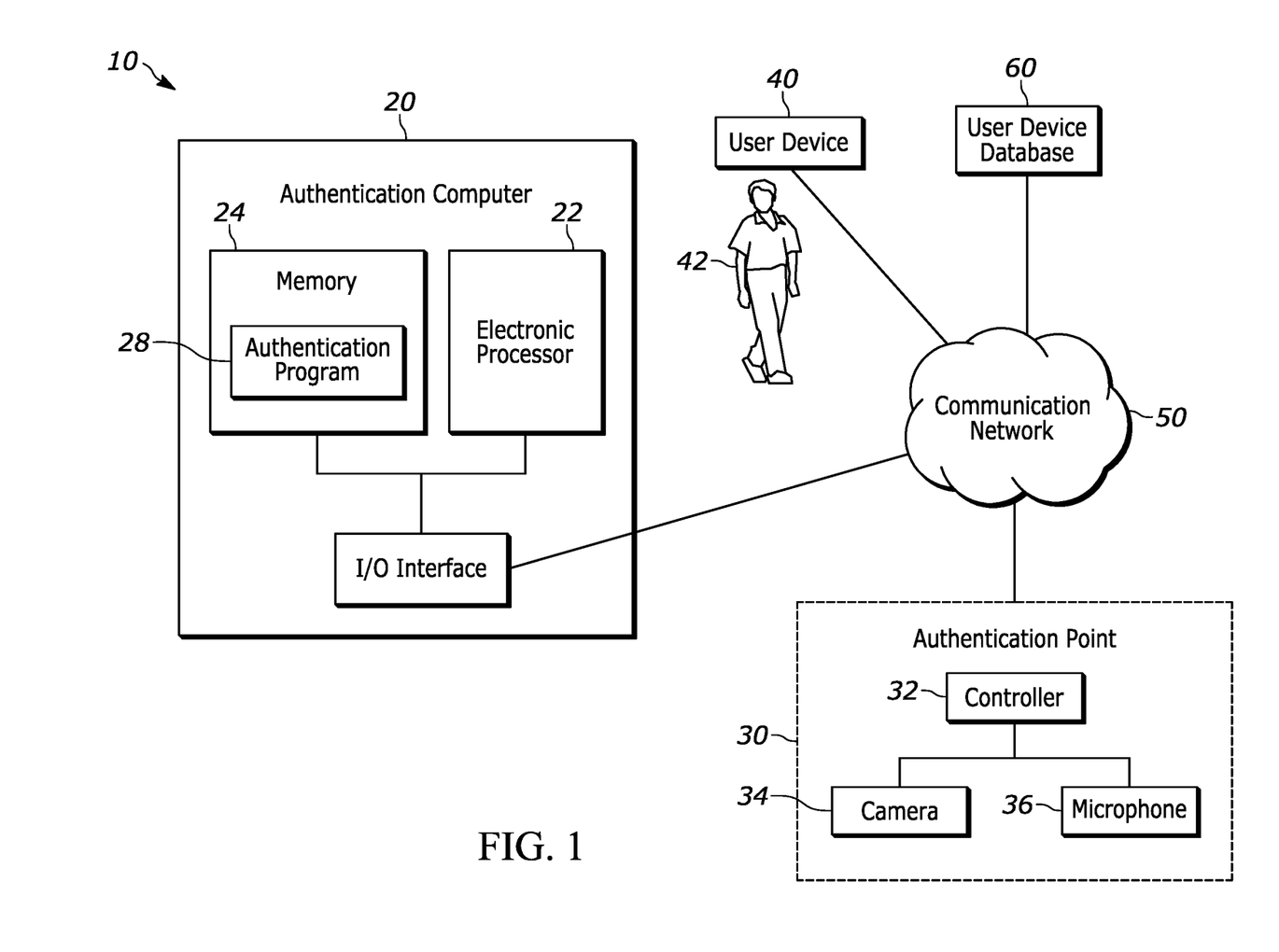
FIG. 1 is a block diagram of an authentication system according to some embodiments.

FIG. 1 schematically illustrates an authentication system 10 according to some embodiments. As illustrated in FIG. 1, the system 10 includes an authentication computer 20, an authentication point 30, and a user device 40 worn by a user 42, which may be, for example, an AR device. The authentication computer 20, authentication point 30, and the user device 40 communicate over a communication network 50. The communication network 50 may be implemented using wired communication components, wireless communication components, or a combination thereof and may include various types of networks or interconnections, such as, for example, a cellular network, a land mobile radio network, a trunked radio network, a wide area network (such as, for example, the Internet), a local area network (such as, for example, a Wi-Fi® network), a short-range wireless network or connection, or a combination of the foregoing. It should be understood that, in some embodiments, one or more dedicated connections or communication channels may be used between one or more of the components of the authentication system 10. For example, in some embodiments, the authentication computer may communicate with the authentication point over a dedicated wired or wireless connection.

For ease of description, the system 10 illustrated in FIG. 1 includes a single authentication point 30 and a single user device 40. Other embodiments, however, may include more than one authentication point 30, more than one user device 40, or a combination thereof. Similarly, some embodiments may multiple communication networks 50. Also, in some embodiments, the functionality described herein as being performed via the authentication computer 20 may be distributed over a plurality of devices, such as, for example, functionality described herein may be distributed between the authentication computer 20 and the authentication point 30, distributed between multiple computing devices included in a cloud computing or other distributed environment, or a combination thereof. Also, in some embodiments, the authentication computer 20 performs functionality in addition to the functionality described herein.

As noted above, in some embodiments, the user device 40 is an AR device that includes a wearable device configured to present data (visually, audibly, or a combination thereof) to a user wearing the device. In some embodiments, the AR device includes AR glasses, VR glasses, or AR/VR glasses (also referred herein to as "smart glasses"). However, it should be understood that the AR device is not limited to glasses or eyewear but may include a contact lens, a head-mounted, head-up, or virtual retinal display, a smart watch, bracelet, or other wearable device, an earpiece, or the like. Also, as previously noted, embodiments described herein are not limited to AR devices and may be used with other type of user devices worn by the user 42.

The authentication computer 20 includes a plurality of electrical and electronic components that provide power, operational control, and protection to the components and modules within the authentication computer 20. For example, as illustrated in FIG. 1, in some embodiments, the authentication computer 20 includes an electronic processor 22 (for example, an electronic microprocessor, microcontroller, or similar device), a memory 24 (for example, non-transitory, computer-readable memory), and an input/output (I/O) interface 26. The authentication computer 20 may include additional or alternative components, including additional electronic processors and memory, or application specific integrated circuits (ASICs), as well as one or more input devices, output devices, or a combination thereof.

The components of the authentication computer 20 may be connected in various ways including, for example, a local bus. The electronic processor 22 is communicatively coupled to the memory 24 and executes instructions stored on the memory 24. The electronic processor 22 is configured to retrieve from the memory 24 and execute, among other things, instructions related to the control processes and methods described herein. For example, the memory 24 may include a program storage area and a data storage area, and the electronic processor 22 is connected to the memory 24 and executes computer readable instructions ("software") stored in a random access memory (RAM) of the memory 24, a read only memory (ROM) of the memory, or another non-transitory computer readable medium. For example, as illustrated in FIG. 1, the memory 24 may store an authentication program 28 that, when executed by the electronic processor 22, receives data from the authentication point 30, selects an authentication method for a user associated with the authentication point, and informs both the authentication point 30 and the user device 40 of the selected authentication method as described in more detail below. Furthermore, in some embodiments, the authentication program 28 is also configured, when executed by the electronic processor 22, to authenticate a user based on received data, such as for example, via biometric authentication including facial recognition, determine whether the user correctly performed the instructed action and, in response to such correct execution, authenticate the user to use a resource. The authentication program 28 may include firmware, one or more applications, program data, filters, rules, one or more program modules, other executable instructions, or a combination thereof and, in some embodiments, the authentication program 28, when executed, is configured to perform additional functionality than the authentication functionality described herein. Also, as noted above, functionality described herein as being performed via execution of the authentication program 28 may be distributed among multiple devices in the same or separate housing. For example, in some embodiments, the authentication point 30 may be configured to perform all or a portion of the functionality of the authentication program 28 as described herein.

The input/output interface 26 is configured to transmit data to and receive data from one or more devices, networks, or systems external to the authentication computer 20. For example, as illustrated in FIG. 1, the authentication computer 20 (through the input/output interface 26) is configured to communicate with the communication network 50, which allows the authentication computer 20 to communicate with the user device 40 worn by the user 42, the authentication point 30, or a combination thereof. It should be understood that the authentication computer 20 may communicate with the user device 40, the authentication point 30, or both through one or more intermediary devices (not shown).

As illustrated in FIG. 1, in some embodiments, the authentication computer 20 also communicates with a user device database 60. The user device database 60 stores information regarding authenticated users and identifiers of devices assigned to such users. For example, the user device database 60 may store a record for the user 42 that identifies the user, such as, for example, by name, a unique user identifier, a role, or the like and, optionally, credentials of the users, such as, for example, access rights to various resources. Each user record may also store or be associated with one or more unique device identifiers that can be used to communicate with a device assigned to the user, such as for example, an AR device worn by the user. As described in more detail below, the authentication computer 20 may access the user device database 60 to determine an identifier of the user device 40, wherein the authentication computer 20 uses the identifier of the user device 40 to transmit the instructions regarding the selected authentication method (the action to be performed by the user 42) to the user device 40. In some embodiments, portions of the data stored in the user device database 60 may be stored on the authentication computer 20, the authentication point 30, or may be distributed among multiple databases.

In some embodiments, the authentication computer 20 may similarly access one or more external systems or database to access stored user information, such as for example, equipment information, user credentials, user limitations, disabilities, or preferences, or the like, which the authentication computer 20 may use to select an authentication method as described in more detail below. For example, in some embodiments, the authentication computer 20 is configured to access one or more systems or database that track a geolocation of the user 42 (the user device 40 or other user device worn by the user 42), track an active assignment of the user 42, or other information providing a context for the user's current activity or state. The authentication computer 20 may access such databases or systems via the communication network 50 or other connections or communication channels and may, in some embodiments, access such systems or databases via various intermediary devices. Also, in some embodiments, this data or portions thereof may be stored on the authentication computer 20.

The authentication point 30 represents an access point for a resource and may include one or more detection devices physically located close to a resource. For example, the authentication point 30 may include one or more edge policing assets, such as, for example, a surveillance camera, a drone, closed-circuit television (CCTV), a body-worn camera (BCW), a smart phone, or other systems or devices configured to capture image data, audio data, or a combination therefore. As one non-limiting example, the authentication point 30 may include a CCTV camera, wherein the field of view of the camera includes a physical access control device, such as, for example, a locked door, a turnstile, a mantrap, a bollard, or the like configured to regulate access to a physical location or object. As described in more detail below, data detected via the authentication point 30 is transmitted to the authentication computer 20, wherein the authentication computer 20 processes the detected data to perform user authentication and control access to a resource based on the authentication (or lack thereof). In some embodiments, the authentication point 30 is associated with a public safety organization or may be associated with a separate individual or entity, such as, for example, a surveillance system used by homeowners at a residence, a surveillance system used by a bank or store, and the like. Also, as used herein, the term "image data" includes both still image data and video data.

As illustrated in FIG. 1, the authentication point 30, according to one embodiment, includes a controller 32, a camera 34, and a microphone 36. In some embodiments, the controller 32 includes similar components as described above with respect to the authentication computer 20, such as, for example, an electronic processor, a memory, and an I/O interface. In some embodiments, the controller 32 includes a digital signal processor, a graphics processing unit, or similar device or circuit for processing image data and audio data. In some embodiments, separate controllers 32 may be used for processing audio data and image data. In other embodiments, a single controller 32 may be configured to process both types of data. The authentication point 30 may include a single device for capturing both audio data and image data or may include multiple devices. For example, in some embodiments, the authentication point 30 include one device including the camera 34 and another device (included in a separate housing) including the microphone 36, wherein the two components operate together to form the authentication point 30. The authentication point 30 may include fewer or additional components than those illustrated in FIG. 1. For example, in some embodiments, the authentication point 30 only includes the camera 34 but not the microphone 36 or vice versa. Also, in some embodiments, the authentication point 30 includes multiple cameras, multiple microphones, or a combination thereof. Also, in some embodiments, the authentication point 30 includes additional components in addition to or as an alternative to the camera 34, the microphone 36, or both. For example, the authentication point 30 may include a keypad or other human-machine interface that allows a user to type in a password or code or other authentication data. Similarly, in some embodiments, the authentication point 30 includes a sensor for detecting signals transmitted via one or more transmitters worn by the user 42. For example, the user 42 may wear a radio frequency (RF), such as a key card, that transmits a signal detected by a sensor included in the authentication point 30 and used by the authentication point 30, the authentication computer 20, or both to authenticate the user 42.

In some embodiments, the authentication point 30 is configured to receive authentication data from the user 42 and communicate with the authentication computer 20 to authenticate the user 42 and control the user's access to a resource accordingly. For example, the camera 34 included in the authentication point 30 may be configured to capture image data of the user 42 approaching a locked door (a resource) and transmit the image data to the authentication computer 20 for processing. The authentication computer 20 (the authentication program 28 as executed by the electronic processor 22) uses the received image data to perform user authentication, such as, for example, biometric authentication, which may use facial recognition to determine an identity of the user 42. In response to the authentication computer 20 successfully determining the user's identity based on the received image data, the authentication computer 20 may instruct the authentication point 30 or a separate device to unlock the door.

As also noted above, in some situations, multi-factor authentication may be used to increase security and access control for a resource. For example, continuing with the above example, after identifying the user's identity via biometric authentication, the authentication computer 20 may (through the authentication point 30) prompt the user to input additional authentication data, such as, for example, by prompting the user to type in a password or code into a key pad included in the authentication point 30 or separate from the authentication point 30. However, in some situations, the user 42 may not be able to provide certain requested authentication data depending on one or more constraints of the user that impact the availability of the user's voice, hands, or other body parts for providing authentication data.

Accordingly, to solve these and other technical issues, embodiments described herein detect such user constraints and automatically select an appropriate authentication method based on the constraints. For example, as described in more detail below, after initially detecting an identity of the user 42 as the user 42 approaches the locked door, the authentication computer 20 (based on image data captured via the camera 34) may determine that the user's hands are available to type in a password or code and, thus, may select an authentication method for the user 42 that uses a different part of the user's body to provide the authentication data, such as, for example, by speaking a selected phrase or nodding the user's head. The selected authentication method may be transmitted to the user device 40 worn by the user 42 to limit access to the selected method and inform the user 42 of the selected method without requiring that the user access his or her phone or other device, which the user may similarly have limited availability or access to given the user's current state.

Figure 2:
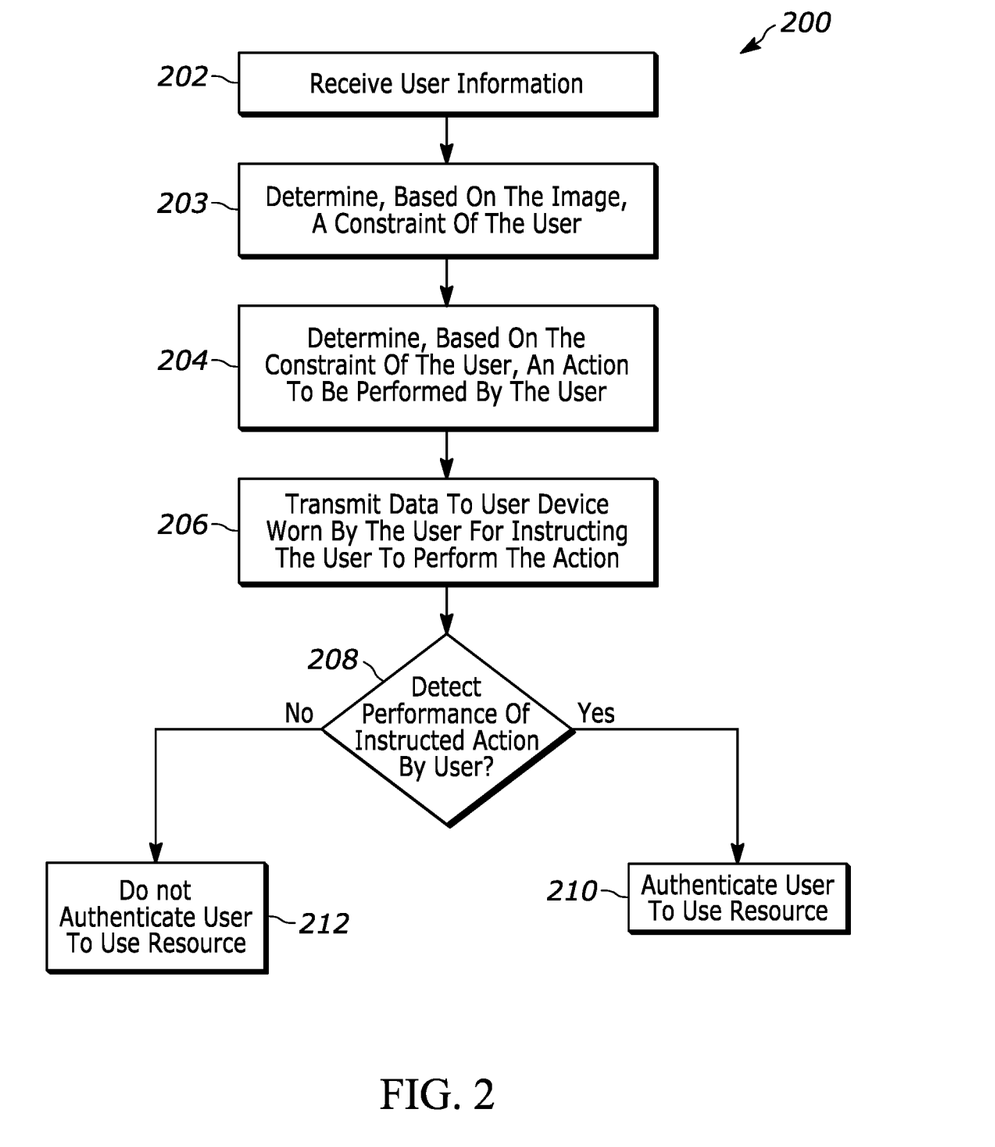
FIG. 2 is a flowchart of a method of selecting an authentication method performed by the system of FIG. 1 in accordance with some embodiments.

For example, FIG. 2 illustrates a method 200 for authentication a user for use or access to a resource according to some embodiments. The method 200 is described as being performed by the authentication computer 20 and, in particular, electronic processor included in the authentication computer 20. However, it should be the functionality described herein as part of the method 200 may be distributed among one or more devices in various configurations. For example, in some embodiments, the authentication point 30 is configured to perform portions of the method 200 described herein as being performed by the authentication computer 20. The resource may include a physical resource such as a door, a compartment, equipment, or the like, wherein authenticating the user to use the resource includes unlocking the resource. Alternatively, the resource may include a computer resource, wherein authenticating the user to use the resource includes granting the user access to the computer resource.

As illustrated in FIG. 2, the method 200 includes receiving, with the authentication computer 20, user information (at block 202). In some embodiments, the user information includes an image of the user 42 captured by the camera 34 included in the authentication point 30. Alternatively or in addition, the user information includes stored user information representing, for example, equipment associated with the user, a user condition, a user limitation, a user disability, or a combination thereof. Such information may be stored as part of a user profile.

The method 200 also includes determining, with the authentication computer 20, a constraint of the user based on the user information (at block 203), wherein the constraint of the user impacts the availability of the user to provide authentication data. The method 200 also includes determining, with the authentication computer 20 based on the constraint of the user, an action to be performed by the user (at block 204).

In some embodiments, the authentication computer 20 determines the constraint of the user by determining, based on the image, whether the user is wearing something that makes one or more parts of the user's body unavailable for providing authentication data. For example, the authentication computer 20 may be configured to process the image using various image analytics techniques that perform object recognition or classification to determine whether a particular object is in the image and, in particular, whether the user 42 is wearing a glove, a helmet, a mask, or sunglasses. Similarly, the authentication computer 20 may be configured to determine whether the user 42 has a particular item in their possession, such as, for example, by determining whether the user has an item in his or her hand, which may limit the user's ability to use his or hands to provide authentication data. For example, the authentication computer 20 may be configured to determine whether the user 42 is leading a suspect or another person, animal, or object with his or her hands, which makes the user's hands available for providing authentication data. Again, the authentication computer 20 may use various object recognition or classification methods to process the received image and determine any items in the user's possession.

As an alternative to or in addition to using captured image data, the authentication computer 20 may be configured to use other types of user information, including stored user information (a user profile) that may represent, for example, what equipment has been issued to the user, a user's current location or job assignment, a religious practice or personal preference or behavior, a disability of the user, or the like. The authentication computer may similarly use the stored user information to determine what one or more user constraints representing one or more types of authentication data the user may not be able to provide.

In response to determining the user constraints (items or objects worn or in the user's possession or control or other user limitations or capabilities), the authentication computer 20 may apply one or more rules that associate particular user states or contexts with a particular authentication method. For example, in response detecting that a user is wearing a helmet, mask, or sunglasses, the rules may specify that a verbal action or a bodily movement action be selected for authentication purposes, as facial recognition, iris scans, or the like are unavailable. Similarly, in response to detecting that the user has an item in his or her hands, the rules may specify that a verbal action or a bodily movement action be selected, as hand-based gestures and password or code inputs are unavailable.

In some embodiments, the rules applied by the authentication computer 20 may designate a particular authentication method (action) to select in response to detecting a particular user state or constraint. However, in other embodiments, the rules may designate one or more authentication methods (actions) to not use. For example, the authentication computer 20 may store a ranked list of performance actions and may select the top ranked method from the list after removing any unavailable methods as specified via the rules.

For example, in some embodiments, the authentication computer 20 is configured to determine a busy score for a predetermined list of body part of the user 42 based on the received image. For example, in response to determining that the user is wearing sunglasses, the authentication computer 20 may assign the eyes a busy score that is indicates that the user's eyes are unavailable for authentication purposes. In some embodiments, the busy score includes a binary score, such as, for example, 0 or 1 depending on whether the body part is busy as determined based on the analysis of the received image. In other embodiments, however, the busy score may be selected from a range of available scores, wherein the assigned score may depend on a degree of how busy the body part is. For example, the eyes of a user wearing dark or reflective sunglasses may be assigned a higher busy score than the eyes of a user wearing lighter sunglasses where the user's eyes are still at least partially visible.

The authentication computer 20 may use the busy scores to eliminate authentication methods from the list of available methods or select a particular authentication method using rules as described above. Also, in some embodiments, the authentication computer 20 may combine the busy score with a criticality score for the body part. The criticality score may be based on the type of item or object worn by the user or in the user's possession that is making a particular body part "busy." For example, when the user 42 is carrying any type of item in his or her hands, the user's hands may be designated as being busy. However, if the user is carrying a soda can in his or her hands, the busy state of the user's hands is less critical as compared to if the user is leading a suspect with his or her hands. For example, if the user is leading a suspect, the criticality score for the user's busy hands may be high because the user should not take his or her hands off of the suspect. In comparison, if the user's hands are busy with carrying a soda can, the criticality score for the user's hands should be lower. Accordingly, the criticality score can be used by the authentication computer 20 to determine when to avoid a particular authentication method and when a particular authentication can be selected. For example, when the user's hands are busy carrying a soda can, the authentication computer 20 may use the lower criticality score (for example, as compared to a predetermined threshold) to determine whether to avoid selecting an authentication method involving hand gestures or whether to select such a method.

The authentication computer 20 may also use other inputs (other than the processed image) to determine a selected authentication method (action). For example, in some embodiments, the authentication computer 20 obtains a location of the detected user, which, as noted above, may be maintained by the authentication computer 20 or a separate system or database. The known location of the user may be used by the authentication computer 20 to avoid particular authentication methods. For example, in response to determining that the user is currently battling a fire, the authentication computer 20 may avoid visually-based authentication methods as these methods may be difficult to detect given smoke or other debris present in the area. Similarly, the authentication computer 20 may determine a current assignment or task of the user. For example, if the current task assigned to the user is leading a suspect, the authentication computer 20 may avoid authentication methods involving hand gestures, such as for example, regardless of the busy score, criticality score, or a combination thereof determined by the authentication computer 20 based on the received image. Similarly, if a current task assigned to the user is a covert task, the authentication computer 20 may be configured to avoid any verbal authentication methods or large gesture authentication methods, which may unintentionally reveal the user's location or position.

Alternatively or in addition to using the score and rules-based logic described above to determine user constraints and selected actions, the authentication computer 20 may implement a machine-learned model, wherein the model may be initially trained using a set of images labeled or otherwise associated with one or more optimal authentication methods. This training set trains the model to learn what actions are best for different situations. After an initial training, the model could be further trained online using feedback. For example, authentication computer 20 may be configured to receive feedback from the user regarding the selected action, wherein such feedback can be used to providing additional training of the model. Similarly, the model can be trained using feedback relating to the time associated with performing a selected action, such as, for example, when a selected action may not be performed within a predetermined time period and, thus, may be too complex or difficult of an authentication action. For example, the authentication system may determine a time between transmitting the selected action to the user device and when the selected action was detected. This elapsed time can be used as feedback to the machine-learned model, which allows the models to be updated (improved) and avoid selecting actions that may be too complex and, thus, take too much time to complete. Accordingly, as compared to having default or hardcoded authentication methods for particular scenarios, using a machine-learned model allows the authentication computer 20 to select an appropriate authentication method based on previous experiences and better adapt to new scenarios. Also, in some embodiments, feedback from a user regarding selected authentication methods may be used to establish a profile or preferences of the user, which also allows the authentication computer 20 to customize authentication method selections for particular users.

The selected authentication method (action) may include a verbal action, a physical action, or a combination thereof. For example, the selected action may include speaking a designated phrase (verbal command), moving a part of the user's body, moving an item in the user's possession, moving one or more parts of the user's body in a designated sequence, and acting on an augmented reality object displayed via the augmented reality device. For example, in response to detecting, based on the received image, that the user 42 is wearing sunglasses, the selected action may include removing the sunglasses for a predetermined period of time or moving the sunglasses in a particular way. Similarly, in some embodiments, the authentication computer 20 may access data regarding equipment assigned to the user, which the authentication computer 20 may incorporate into the selected action. For example, if the authentication computer 20 determines that the user was assigned a particular type of radio, the selected action may involve showing the radio, operating the radio in a particular way, or the like.

Also, in some embodiments, the selected action involves multiple users. For example, if, based on the received image, a second user is detected around the user 42 and the authentication computer 20 determines an identity of the second user (such that the authentication computer 20 can also communicate with an AR device worn by the second user), the selected action may involve actions by both users. For example, the action may involve both users interacting with an AR object, interacting with each other (for example, shaking hands, high-fiving, or the like), speaking a particular sequence of phrases, or performing a particular sequence of actions. In such a two (or multiple) user scenario, the authentication computer 20 is configured to transmit data to the AR device associated with each user as generally described below. It should be understood that the data transmitted to each user's AR device may be the same or different depending on the selected action. For example, if the selected action includes both users performing the same action, the transmitted data may be the same. However, if the selected action includes different actions or a particular sequence of actions or verbal commands by the users, the transmitted data may differ given that each user needs to perform a different action.

Also, in some embodiments, the selected action may include two actions, wherein both actions are usable by the user 42 to provide authentication data and access the resource, but wherein one of the actions allows the user 42 to additional convey a distress condition of the user where additional assistance may be required.

As illustrated in FIG. 2, after selecting an action (authentication method) based on the user constraints, the method 200 further includes transmitting data to the user device 40 worn by the user 42 (at block 206), wherein the transmitted data is usable by the user device 40 to output instructions (visual instructions, audible instructions, tactile instructions, or a combination thereof) to the user 42 to perform the selected action.

In some embodiments, the authentication computer 20 transmits the data specifically to the user device 40 worn by the user (without transmitting the data to any other devices). For example, in some embodiments, the authentication computer 20 uses the received image (or other received data) to perform an initial authentication of the user, such as, for example, a first factor authentication. For example, the authentication computer 20 may use the received image to perform biometric authentication, such as, for example, facial recognition. The authentication computer 20 uses this initial authentication to access the user device database 60 to determine a unique identifier of the user device 40 and transmit the data accordingly.

Also, in some embodiments, the authentication computer 20 may perform one or more checks before transmitting the data to the user device 40. For example, to detect imposters or ensure that the selected authentication method is transmitted to the correct user or user device, the authentication computer 20 may determine the location of the user 42, such as, for example, by accessing various geolocation tracking systems or databases, and transit the data to the AR device only after confirming that the user is located at or within a predetermined distance of the authentication point 30. Also, in some embodiments, the authentication computer 20 may confirm that the identified has access rights to the resource before transmitting the data. In some embodiments, the authentication computer 20 may perform this check prior to selecting an authentication method for the user as described above.

In some embodiments, the authentication computer 20 similarly uses the initial authentication of the user to determine whether a second factor of authentication is needed, such as, for example, prior to selecting an authentication method as described above. For example, the initial authentication and identity determination performed by the authentication computer 20 may be associated with a confidence level, which may be compared with one or more thresholds to determine whether secondary authentication is needed. As one non-limiting example, in response to detecting an identity of the user 42 based on the received image satisfying a predetermined threshold (for example, 75%, 80%, 85% 90%, 95%, or 100%), the authentication computer 20 may determine that no secondary authentication is needed and may grant the user 42 access to the resource without selecting a secondary authentication method as described above. However, if the confidence level of the determined identity of the user 42 does not satisfy the predetermined threshold, the authentication computer 20 may select a secondary authentication method as described above with respect to blocks 203 and 204.

It should also be understood that in some embodiments the data is transmitted to the user device 40 worn by the user without first determining an identity of the user 42 or an identifier of the user device 40. For example, in some embodiments, the authentication computer 20 may transmit data that may be received by any user device within a particular distance from the authentication point 30. Also, in some embodiments, the authentication computer 20 may use the authentication point 30 to convey instructions to a detected user for providing authentication data. For example, in some embodiments, rather than having a user type in a password or code into a keypad to gain access to a resource, the authentication computer 20 may select a verbal authentication method, such as, for example, in response to detecting that the user's hands are busy. The authentication computer 20 may instruct a display or a speaker at the authentication point 30 to output instructions to the user alerting the user to speak the password or code (as compared to typing the password or code into the keypad). Also, it should be understood that embodiments described herein may be used with other types of user devices and is not limited to being used with AR devices worn by a user. For example, the authentication computer 20 may be configured to communicate instructions regarding selected authentication methods to a user via the user's smart phone, radio, smart watch or other type of user device worn by the user.

In response to detecting the selected action performed by the user 42 with the authentication computer 20 (at block 208), the user is authenticated to use the resource (at block 210). Alternatively, in response to not detecting the selected action performed by the user 42, the user is not authenticated to use the resource (at block 212). For example, the user 42 may not be authenticated to use the resource if the authentication computer 20 does not detect the selected action (based on image data, audio data, or other data detected via the authentication point 30) or if the authentication computer 20 does not detect the selected within a predetermined amount of time. As noted above, in some embodiments, the authentication computer 20 is configured to authenticate a user by determining whether the user performs the selected action as instructed. However, in other embodiments, the authentication computer 20 transmits the selected action to the authentication point 30, wherein the authentication point 30 determines whether the selected action was performed and may subsequently control access to the resource accordingly.

Data regarding whether the selected action was performed may also be used, as described above, as feedback for the authentication computer 20, such as, for example, feedback to a machine-learned model applied by the authentication computer 20 to select actions. For example, if a particular action is often not detected as being performed (implying that the action is to complex or hasn't properly considered the user constraints), the machine-learned model may learn not to subsequently select the action. Direct user feedback may also be supplied to the authentication computer 20. For example, a user may be able to request a different authentication method after receiving the instructions regarding the selected authentication method (action). The user may make such a request by speaking a particular command or taking a particular action at the authentication point 30. In addition to selecting a different authentication method per the functionality described above (while avoiding the previously selected method), this user feedback may also be used as feedback (for example, to a machine-learned model) to limit or prevent selection of the rejected action in the future. As also noted above, such feedback may be applied at a system level or a user level, such as, for example, to create customized authentication selections for particular users.

EXAMPLE USE CASES

Figure 3:
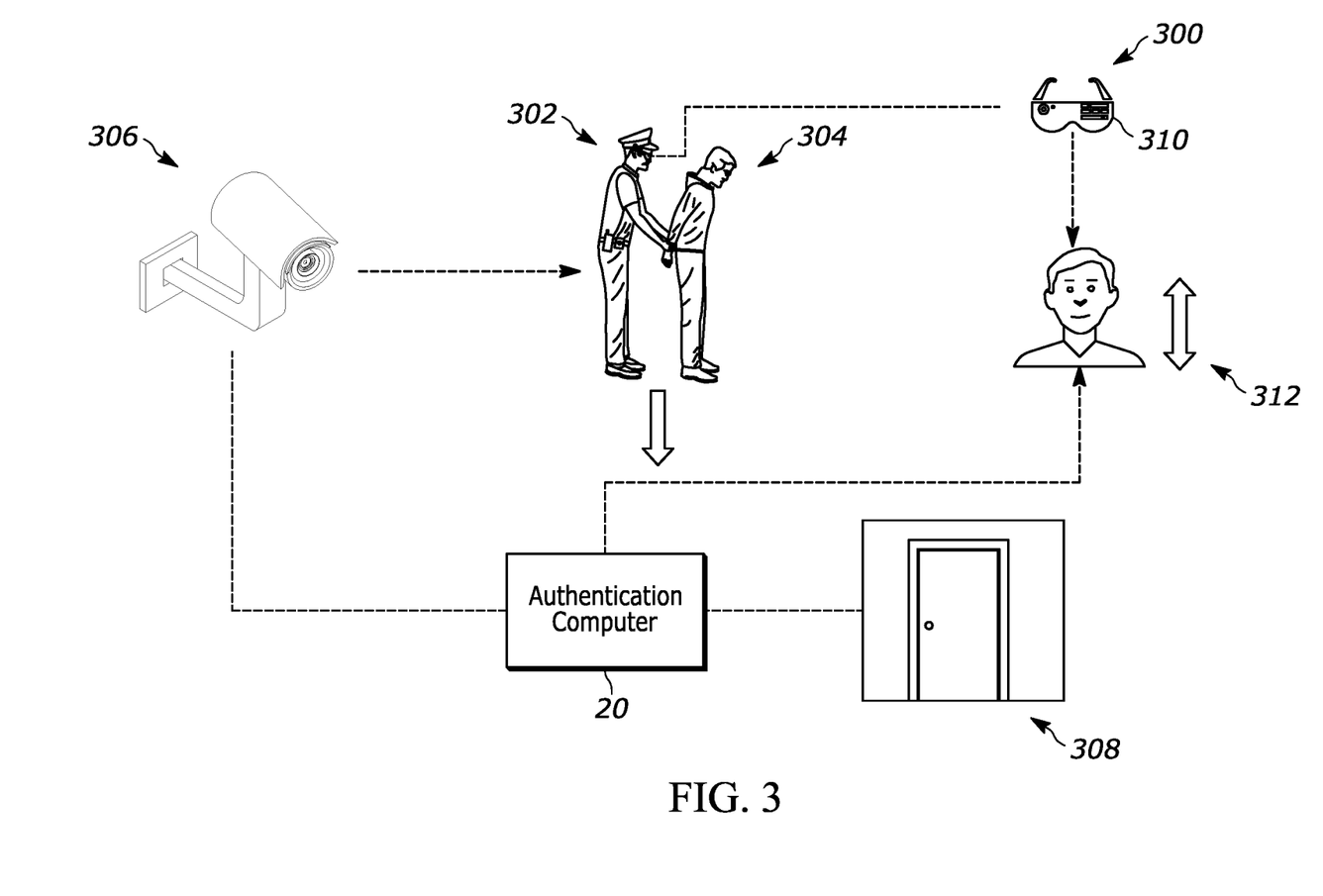
FIG. 3 illustrates an example use case applying the method of FIG. 2 in accordance with some embodiments.

As a non-limiting example use case 300 illustrated in FIG. 3, assume a police officer 302 is leading a suspect 304, and, thus, the police officer's hands are full. When a camera 306 associated with an authentication point, such as, for example, a locked door 308, captures image data of the police officer 302, the authentication computer 20 selects and sends an action to be performed by the police officer 302 on the officer's smart glasses 310. The action is only sent to the smart glasses of the detected officer 302 based on an initial identification of the officer 302 determined by the authentication computer 20 using the image data captured by the camera 306 (for example, using biometric authentication). Also, because the officer's hands are full, the action sent by the authentication computer 20 instructs the officer 302 (see, for example, example visual instructions 312) to nod his head three times. In response to the officer 302 completing the instructed action correctly, the locked door 308 is opened, which allows the officer 302 to pass through the door 308 and do so without releasing the suspect 304 or changing the officer's 302 grip or hold on the suspect 304.

As another non-limiting example, assume firefighter Jane goes to a locked door. Based on an image captured by a camera associated with the locked door, the authentication computer 20 recognizes Jane and detects that Jane's hands are full, such as, for example, with equipment. Additionally, the authentication computer 20 detects that Jane is focusing on an important task, such as, for example, battling an active fire. The authentication computer 20 may perform this determination based on accessing task assignments for Jane, incident reports, Jane's current location, the captured image data, or a combination thereof. Accordingly, based on detected environmental demands, the authentication computer 20 sends an action to Jane's smart glasses instructing Jane to say the phrase "fish." Speaking this phrase may pose less of a risk of breaking Jane's current focus as compared to instructing Jane to perform a particular physical action or gesture. The action is only sent to Jane's smart glasses, and, in response detecting that Jane spoke the instructed phrase, the door is opened.

As another example and non-limiting use case, assume fireman John wants to unlock a door in a building from the far distance, such as, for example, 25 yards or more. The authentication system 10 leverages a CCTV camera installed on the building and facial recognition to recognize John with a 70% confidence. However, John is wearing smart glasses. Accordingly, to perform second factor authentication (for example, based on the low confidence level of the initial authentication determined using facial recognition), the authentication computer 20 sends a request to John's smart glasses. In particular, as John's hands are busy carrying firefighting equipment (as determined based on image data captured via the CCTV camera), the authentication computer 20 requests that John move his head left and right to provide authentication data. In response to John executing the request correctly (detected, for example, via the CCTV camera, the John's smart glasses, or a combination thereof), John is authenticated by the authentication computer 20, which, in response, unlocks the door to allow John to access the building.

In a further non-limiting example use case, assume police officer Jane goes to a locked door. A camera associated with the locked door captures an image of Jane, which allows the authentication computer 20 to detect the police officer and potentially perform a first factor of authentication, such as, for example, via biometric authentication. The authentication computer 20, however, may also detect, based on the captured image, that another unrecognized user is nearby Jane. In this situation, the authentication computer 20 may send an instruction to Jane's smart glasses instructing Jane to blink three times to provide a second factor of authentication covertly. In response to detecting execution of the instructed action, the door is unlocked.

As an additional non-limiting example, assume police officer John is kidnapped and led by an attacker to a locked door. At the locked door, the authentication computer 20 may recognize John and provide a selected authentication method as described above. However, the authentication computer 20 may also detect that John is in danger, such as for example, based on the officer's pose or position in the captured image, the officer's pulse or other biometric data, access incident data, or the like. In response to detecting a potential distress situation, the authentication computer 20 may send two actions to John's smart glasses: a first action for John to perform to unlock the door and signal distress, and a second action for John to perform to unlock the door and signal a normal situation (John is not in distress). In response to detecting that John performed either the first or the second action, the door is unlocked. However, in response to detecting that John performed the first action, the authentication computer 20 may inform one or more relevant services about the need for officer assistance. Similarly, the authentication computer 20 may trigger or activate one or more alarms to signal John's distress.

As yet a further non-limiting example use case, assume police officer John and police officer Jane approach a locked door. At the locked door, the authentication computer 20 may recognize John and Jane but with low confidence levels given the environmental conditions around the locked door or user constraints of John and Jane. To receive secondary authentication data from both Jane and John for accessing the locked door, the authentication computer 20 may transmit data to both Jane and John's smart glasses instructing both Jane and John pull on an AR rope provided via each of their smart glasses. In response to detecting both Jane and John performing the instructed action, the door is unlocked. However, in response to detecting only one of Jane or John performing the action, the door may remain locked.

As described above, methods and systems described herein automatically select a convenient authentication method for a user based on the user's current state, which may otherwise constrain the user from providing authentication data. Thus, embodiments described herein improve the ease of use of an authentication point, which makes more efficient of computing resources, such as, for example, because a user does not need to attempt authentication multiple times and provide better access control for a resource. In addition, because the user is being instructed what authentication method and action to use and perform, the method and action can change, which makes authentication data more difficult to exploit as compared to statically using the same authentication method, the same required phrase or action, or a combination thereof. For example, as compared to an authentication system that uses a static password or code for authentication that can be stolen and reused by an unauthorized eavesdropper, embodiments described herein can use a dynamic password or code, which increases security.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for performing user authentication, the system comprising:
   a camera; and
   an authentication computer configured to:
   receive an image of a user captured by the camera, determine, based on the image, a constraint of the user impacting an availability of a part of the user's body for use in authenticating the user, determine, based on the constraint of the user, an action to be performed by the user, transmit data to a user device worn by the user, the data usable by the user device to output instructions to the user to perform the action, and in response to detecting the action performed by the user, authenticating the user to use a resource.

2. The system of claim 1, wherein the resource includes a physical access control device and wherein authenticating the user to use the resource includes at least one selected from a group consisting of opening, moving, and unlocking the physical access control device.

3. The system of claim 1, wherein the resource includes a computer resource and wherein authenticating the user to use the resource includes granting the user access to the computer resource.

4. The system of claim 1, wherein the authentication computer is configured to determine the action to be performed by the user based on the constraint of the user and a location of the user.

5. The system of claim 1, wherein the authentication computer is configured to determine the constraint of the user by determining, based on the image, whether the user is wearing at least one selected from a group consisting of gloves, a helmet, a mask, and sunglasses.

6. The system of claim 1, wherein the authentication computer is configured to determine the constraint of the user by determining, based on the image, whether the user has an item in the user's possession.

7. The system of claim 6, wherein determining an item in the user's possession includes determining, based on the image, whether the user has the item in the user's hand.

8. The system of claim 1, wherein the action includes at least one selected from a group consisting of speaking a designated verbal command, moving a part of the user's body, moving an item in the user's possession, moving one or more parts of the user's body in a designated sequence, and acting on an augmented reality object.

9. The system of claim 1, wherein the authentication computer is further configured to use biometric authentication as a first authentication factor for the user and identify the user device worn by the user based on the first authentication factor, and wherein authenticating the user to use the resource is a second authentication factor.

10. The system of claim 1, wherein the action to be performed by the user includes a first action to be performed by the user for authentication and a second action to be performed by the user for authentication and to convey a distress condition of the user.

11. The system of claim 1, wherein the user is a first user and the user device worn by the first user is a first user device, wherein the action includes an first action to be performed by the first user and a second action to be performed by a second user, wherein the authentication computer is further configured to transmit second data to a second user device worn by the second user, the second data usable by the second user device to output instructions to the second user to perform the second action.

12. The system of claim 1, wherein the authentication computer is configured to determine the action to be performed by the user using a machine-learned model and wherein the authentication computer is further configured to receive feedback on the action to be performed and update the machine-learned model based on the feedback.

13. The system of claim 12, wherein the feedback includes at least one selected from a group consisting of feedback from the user and a time associated with performing the action.

14. The system of claim 1, wherein the user device includes an augmented reality device.

15. Non-transitory computer readable medium storing instructions that, when executed by at least one electronic processor, perform a set of functions, the set of functions comprising:
- receiving user information, the user information including at least one selected from group consisting of an image of a user captured by a camera and stored user information,
- determining, based on the user information, a constraint of the user impacting the user's ability to provide authentication data,
- determining, based on the constraint of the user, an action to be performed by the user,
- transmitting data to a user device worn by the user, the data usable by the user device to output instructions to the user to perform the action, and
- in response to detecting the action performed by the user, authenticating the user to use a resource.

* * * * *